United States Patent
Park et al.

(10) Patent No.: US 12,479,971 B2
(45) Date of Patent: Nov. 25, 2025

(54) CONDUCTIVE PASTE COMPOSITION CONTAINING SILVER-COATED COPPER NANOWIRES WITH CORE-SHELL STRUCTURE AND CONDUCTIVE FILM COMPRISING THE SAME

(71) Applicant: BIONEER CORPORATION, Daejeon (KR)

(72) Inventors: Han Oh Park, Sejong-si (KR); Jae Ha Kim, Daejeon (KR); Jun Pyo Kim, Sejong-si (KR); Kug Jin Yun, Daejeon (KR)

(73) Assignee: BIONEER CORPORATION, Daejeon (KR)

( * ) Notice: Subject to any disclaimer, the term of this patent is extended or adjusted under 35 U.S.C. 154(b) by 654 days.

(21) Appl. No.: 17/753,519

(22) PCT Filed: Oct. 31, 2019

(86) PCT No.: PCT/KR2019/014588
§ 371 (c)(1),
(2) Date: Mar. 4, 2022

(87) PCT Pub. No.: WO2021/045307
PCT Pub. Date: Mar. 11, 2021

(65) Prior Publication Data
US 2023/0011343 A1    Jan. 12, 2023

(30) Foreign Application Priority Data
Sep. 6, 2019 (KR) .................. 10-2019-0110850

(51) Int. Cl.
| | |
|---|---|
| *C08K 3/08* | (2006.01) |
| *B82Y 30/00* | (2011.01) |
| *B82Y 40/00* | (2011.01) |
| *C08J 5/18* | (2006.01) |
| *C08J 7/044* | (2020.01) |
| *C08K 7/06* | (2006.01) |
| *C08K 9/02* | (2006.01) |
| *H01B 1/22* | (2006.01) |

(52) U.S. Cl.
CPC .............. *C08K 3/08* (2013.01); *B82Y 30/00* (2013.01); *B82Y 40/00* (2013.01); *C08J 5/18* (2013.01); *C08J 7/044* (2020.01); *C08K 7/06* (2013.01); *C08K 9/02* (2013.01); *H01B 1/22* (2013.01); *C08J 2383/04* (2013.01); *C08K 2003/0806* (2013.01); *C08K 2201/001* (2013.01); *C08K 2201/005* (2013.01); *C08K 2201/011* (2013.01)

(58) Field of Classification Search
CPC ........ H01B 1/22; C09D 183/04; C09J 183/04; C08L 83/04; C08L 101/00; C08J 2383/04
See application file for complete search history.

(56) References Cited

U.S. PATENT DOCUMENTS

| | | | |
|---|---|---|---|
| 2010/0209599 A1 | 8/2010 | Van Veen et al. | |
| 2011/0062389 A1 | 3/2011 | Wang et al. | |
| 2013/0254072 A1* | 9/2013 | Eraker | G06Q 50/16 705/26.8 |
| 2016/0254072 A1* | 9/2016 | Park | H01B 1/24 252/503 |
| 2018/0017715 A1 | 1/2018 | Matsuda et al. | |

FOREIGN PATENT DOCUMENTS

| | | | | |
|---|---|---|---|---|
| CN | 108695014 A | * | 10/2018 | ............. H01B 1/026 |
| CN | 109906246 A | | 6/2019 | |
| EP | 3159078 A1 | | 4/2017 | |
| EP | 3419027 A1 | | 12/2018 | |
| EP | 3466570 A1 | * | 4/2019 | ............. B22F 1/0025 |
| JP | 2015537068 A | | 12/2015 | |
| JP | 2016139600 A | | 8/2016 | |
| JP | 2016533001 A | | 10/2016 | |
| JP | 2017523306 A | | 8/2017 | |
| JP | 2019517625 A | | 6/2019 | |
| KR | 20150071713 A | | 6/2015 | |
| KR | 20150145892 A | | 12/2015 | |
| KR | 101789213 B1 | * | 10/2017 | ............. B22F 1/0025 |
| KR | 20180048458 A | | 5/2018 | |
| WO | 2014059577 A1 | | 4/2014 | |
| WO | 2018084518 A1 | | 5/2018 | |

OTHER PUBLICATIONS

Machine translation of CN 108695014 (2018, pages).*
Lee (Novel Fabrication of Silver-Coated Copper Nanowires with Organic Compound Solution, Materials, 2022, 15, pp. 16 pages).*
ISA Korean Intellectual Property Office, International Search Report Issued in Application No. PCT/KR2019/014588, Jun. 25, 2020, WIPO, 4 pages.
European Patent Office, Extended European Search Report Issued in Application No. 19944324.3, Oct. 5, 2023, Germany, 6 pages.
Japanese Patent Office, Office Action Issued in Application No. 2022-514666, Jun. 6, 2023, 5 pages.

* cited by examiner

*Primary Examiner* — Brieann R Johnston
(74) *Attorney, Agent, or Firm* — McCoy Russell LLP

(57) ABSTRACT

A conductive paste composition according to the present disclosure contains silver-coated copper nanowires with a core-shell structure; a binder mixture containing a silicone resin binder and a hydrocarbon-based resin binder; and an organic solvent, such that the conductive paste composition has a low sheet resistance and may withstand a high temperature, thereby implementing excellent conductivity and electromagnetic wave shielding properties. Furthermore, the conductive paste may be widely used in various fields such as electromagnetic wave shielding, solar cell electrodes, electronic circuits, and antennas.

7 Claims, 2 Drawing Sheets

CONDUCTIVE PASTE COMPOSITION CONTAINING SILVER-COATED COPPER NANOWIRES WITH CORE-SHELL STRUCTURE AND CONDUCTIVE FILM COMPRISING THE SAME

TECHNICAL FIELD

The present disclosure relates to a conductive paste composition using a silver-coated copper nanowire with a core-shell structure and a conductive film containing the same.

BACKGROUND AND SUMMARY

In general, a conductive paste is an adhesive having electrical conductivity used for wiring assembly of electrical and electronic products or circuits, and refers to a paste formulated and composed of a binder such as a polymer resin and conductive particles such as Ag particles. Such a conductive paste has been widely used as electrodes of electronic products, electronic component packaging, circuit interconnectors, and the like in the electrical and electronic fields.

In general, conductive pastes used in the market are prepared using a silver powder that has excellent conductivity and is stable. In the conductive paste using silver, in order to obtain a desired high level of conductivity, silver particles are used in an amount of at most 80 wt % or more with respect to the total weight of the paste composition. When this amount of silver is not used, voids are formed between silver particles. Thus, there is no electrical connection, or even if electrical contact points are generated, conductivity is not sufficiently obtained due to a small number of electrical contact points. In addition, such a silver powder material has a low electrical resistance, but is expensive. Therefore, in preparation of a conductive paste, the development of a material that replaces silver or a method of reducing the amount of silver used is required.

Therefore, the present inventors have made efforts to solve the above problems, and as a result, have found that in a case where a conductive paste composition is prepared using a silver-coated copper nanowire with a core-shell structure as a filler, it is possible to prepare a conductive paste composition that has an excellent adhesiveness to a substrate, may have high conductivity with a smaller amount, withstands a high temperature of 300° C., and has high cost-effectiveness and productivity, thereby completing the present disclosure.

RELATED ART DOCUMENT

Korean Patent No. 10-1789213

DISCLOSURE

Technical Problem

An object of the present disclosure is to provide a conductive paste composition that is cost-effective, has excellent conductivity, and may withstand a high temperature of 300° C.

Another object of the present disclosure is to provide a conductive film containing the conductive paste composition and having a low specific resistance.

Technical Solution

In one general aspect, a conductive paste composition contains: silver-coated copper nanowires with a core-shell structure; a binder mixture containing a silicone resin binder and a hydrocarbon-based resin binder; and an organic solvent.

In the embodiment of the present disclosure, the conductive paste composition may contain the silver-coated copper nanowires with a core-shell structure in an amount of 5 to 30 wt %.

In the embodiment of the present disclosure, the conductive paste composition may contain the silicone resin binder in an amount of 3 to 20 wt %.

In the embodiment of the present disclosure, a weight ratio of the binder mixture to the silver-coated copper nanowires may be 1:0.1 to 1.2.

In the embodiment of the present disclosure, in the silicone resin binder, a silanol group may be contained in an amount of 0.1 to 10 wt % with respect to 100 wt % of a total weight of the silicone resin binder, and a molar ratio of a phenyl group to a methyl group may be 0.3 to 2.5.

In the embodiment of the present disclosure, the conductive paste composition may contain the hydrocarbon-based resin binder in an amount of 3 to 15 wt %.

In the embodiment of the present disclosure, one or a mixture of two or more selected from a cellulose-based binder, an acrylic binder having an acrylic repeating unit containing active hydrogen, and a polyvinyl-based binder may be used as the hydrocarbon-based resin binder.

In the embodiment of the present disclosure, a weight ratio of the hydrocarbon-based resin binder to the silicone resin binder may be 1:0.8 to 1.8.

In the embodiment of the present disclosure, the conductive paste composition may contain the organic solvent in an amount of 50 to 90 wt %.

In the embodiment of the present disclosure, the organic solvent may be one or two or more selected from acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol ethyl ether, and terpineol.

In another general aspect, a conductive film contains the conductive paste composition.

Advantageous Effects

The conductive paste composition according to the present disclosure contains silver-coated copper nanowires with a core-shell structure, a binder mixture containing a silicone resin binder and a hydrocarbon-based resin binder, and an organic solvent. Therefore, the conductive paste composition has excellent oxidation stability and thermal stability and thus has a high binding force with the silicone resin binder and high dispersibility. Accordingly, the conductive paste composition has low sheet resistance and specific resistance, such that the conductive paste composition has excellent electrical conductivity and is stable even at a high temperature of 300° C., thereby implementing excellent electrode properties. In addition, the conductive paste composition may be widely used in various fields such as electrodes, electronic circuits, and antennas.

DETAILED DESCRIPTION

Best Mode

Figure 1:
FIG. 1 is a photograph showing a conductive paste prepared according to an embodiment of the present disclosure.
Figure 2:
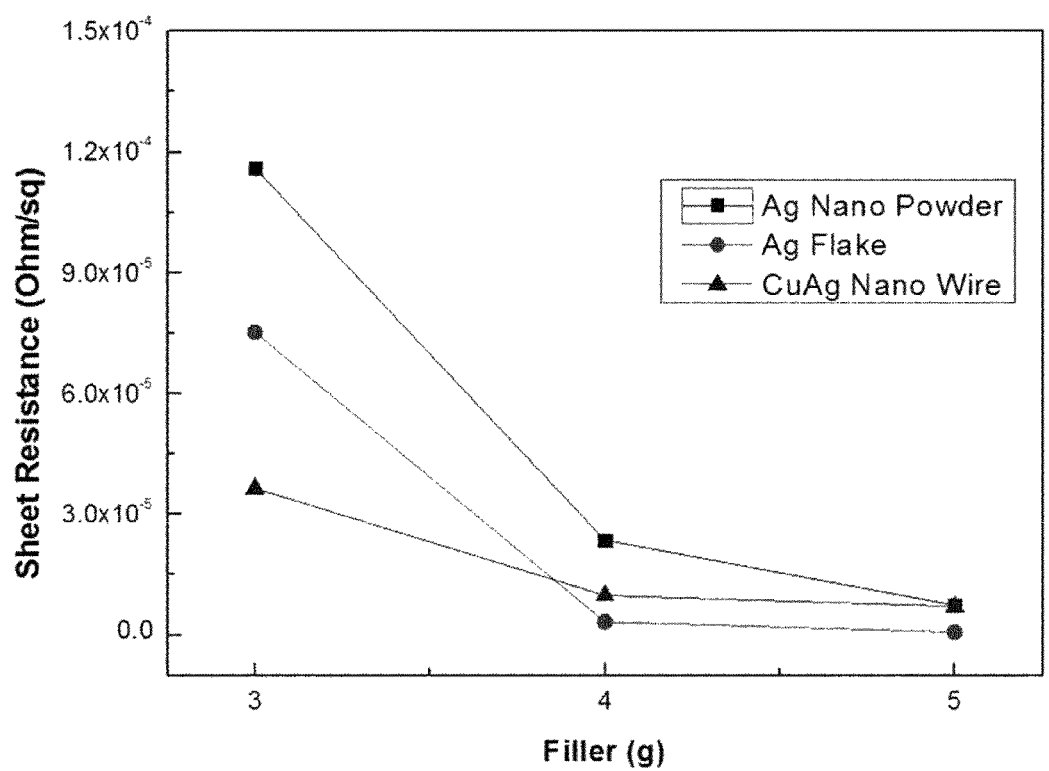
FIG. 2 is a graph showing a change in specific resistance according to the type and amount of filler added.

Hereinafter, a conductive paste composition containing silver-coated copper nanowires with a core-shell structure and a conductive film containing the same according to the present disclosure will be described in more detail with reference to embodiments. However, each of the following embodiments is only a reference example for describing the present disclosure in detail, and the present disclosure is not limited thereto and may be implemented in various forms.

In addition, unless otherwise defined, all the technical terms and scientific terms have the same meanings as commonly understood by those skilled in the art to which the present disclosure pertains. The terms used in the description of the present application are merely used to effectively describe a specific embodiment, but are not intended to limit the present disclosure.

In describing the present disclosure, a unit of % used unambiguously without special mention refers to wt % (w/w %).

The term "nanowire" in the present specification refers to a filler in which a silver-coated copper nanowire used as a conductive filler has a diameter measured in nanometers and a long shape similar to a wire.

The term "silver-coated copper nanowire" in the present specification refers to a nanowire with a core-shell structure including a core formed of a copper nanowire and a shell formed of silver.

In order to achieve the object, the present disclosure provides a conductive paste composition containing silver-coated copper nanowires with a core-shell structure, a silicone resin binder, a hydrocarbon-based resin binder, and an organic solvent.

The present disclosure will be described in detail.

The conductive paste composition according to the present disclosure contains a mixture of a silicone resin binder and a hydrocarbon-based resin binder (hereinafter, referred to as a binder mixture), such that the conductive paste composition may contain the silver-coated copper nanowires in a lower amount than a conductive paste according to the related art.

Specifically, the conductive paste according to the related art is required to contain 48 to 58 wt % of silver-coated copper nanowires with a core-shell structure. However, the conductive paste composition containing the silver-coated copper nanowires with a core-shell structure according to the present disclosure further contains the silicone binder, such that the conductive paste composition may have electrical properties equivalent to or superior to the conductive paste containing 48 to 58 wt % of silver-coated copper nanowires according to the related art, even though it contains the silver-coated copper nanowires in a lower amount than the conductive paste according to the related art.

The conductive paste composition of the present disclosure may contain the silver-coated copper nanowires with a core-shell structure in an amount of 5 to 30 wt % or 5 to 15 wt %. In some embodiments, when the conductive paste composition contains the silver-coated copper nanowires in an amount of 7 to 15 wt % with respect to the total content of the conductive paste, the conductive paste composition may have high conductivity when coating a substrate, and non-uniform dispersion of the silver-coated copper nanowires due to a high viscosity of the composition may be prevented.

The nanowire with a core-shell structure according to the present disclosure is a nanowire with a core-shell structure including a core formed of a copper nanowire and a shell formed of silver, and has excellent oxidation stability and thermal stability in comparison to the existing copper nanowire, for example, a copper nanowire not coated with silver, a spherical particle, a flake shape, or the like.

In addition, dispersibility is excellent due to the shape of the nanowire in comparison to a metal nanoparticle. Since the shape of the nanowire is different from the shape of the particle or the flake, the effect of significantly lowering a sheet resistance of the conductive film may be provided. In addition, a cost may be reduced by using the silver-coated copper nanowire in comparison to use of a silver nanowire.

A diameter of the silver-coated copper nanowire may be 120 to 350 nm, specifically 150 to 350 nm, and more specifically 180 to 320 nm. In this case, when the diameter of the silver-coated copper nanowire is out of the above range, dispersion is not enough. In addition, in an allowable dispersion range, the longer the length of the silver-coated copper nanowire, the better. Accordingly, an aspect ratio of the silver-coated copper nanowire may be 5 to 25, specifically 5 to 20, and more specifically 5 to 15. A method of producing a silver-coated copper nanowire is not limited, and as an example, the method disclosed in Korean Patent No. 10-1789213 B1 (publication date: Oct. 26, 2017) may be used.

In general, the higher the content of the binder contained in the conductive paste, the lower the optical properties and transmittance of the conductive film produced using the conductive paste, and the lower the content of the binder in the conductive paste, the lower the mechanical strength of the conductive film produced using the conductive paste.

However, the conductive paste according to the present disclosure contains the binder mixture containing a silicone resin binder and a hydrocarbon-based resin binder, such that the conductive paste may contain a lower amount of the silver-coated copper nanowires, and the total content of the binder mixture contained in the conductive paste may be significantly reduced.

In terms of realizing the effects described above well, the conductive paste composition according to the present disclosure may contain the binder mixture in an amount of 5 to 40 wt %, or 10 to 30 wt %, or 10 to 20 wt %, with respect to the total content of the conductive paste composition.

As is known, the content of the binder contained in the conductive paste is controlled in proportion to the content of the silver-coated copper nanowires, whereas the conductive paste according to the present disclosure contains a significantly small amount of the binder mixture compared to the amount of the silver-coated copper nanowires.

In terms of satisfying the effects described above, a weight ratio of the binder mixture to the silver-coated copper nanowires may be 1:0.1 to 1.2, specifically 1:0.3 to 1.1, or 1:0.5 to 1:0.

Therefore, even though the conductive paste composition according to the present disclosure contains the silver-coated copper nanowires and the binder in lower amounts than the conductive paste according to the related art, the conductive paste composition according to the present disclosure may have more improved sheet resistance and specific resistance.

In terms of satisfying the effects described above, a weight ratio of the hydrocarbon-based resin binder and the silicone resin binder contained in the binder mixture may be 1:0.8 to 1.8, or 1:1.0 to 1.8, or 1:1.2 to 1.6.

When the conductive paste composition according to the present disclosure contains the silicone resin binder in an amount of 3 to 20 wt %, or 3 to 15 wt %, or 5 to 12 wt %, with respect to the total content of the conductive paste composition, it is possible to prevent detachment due to high adhesion to the substrate when coating the substrate, loss of the original physical properties of the silicone resin, and a reduction in conductivity due to an excessive amount thereof. In addition, by using the silicone resin binder, thermal and electrical properties may be maintained even at a high temperature of 300° C.

In general, the silicone resin binder is a polymer having a polysiloxane main chain in which silicon (Si) atoms and oxygen (O) atoms are alternated. Generally, silicon has a structure in which two organic atomic groups of alkyl such as methyl, ethyl, and propyl or phenyl (—$C_6H_5$) are bonded to each silicon atom. In the silicone resin binder contained in the conductive paste composition according to the present disclosure, hydrogen, a hydroxy group, a methyl group, or a phenyl group may be bonded.

According to an aspect of the present disclosure, as an example, the silicone resin binder may be a polydimethylsiloxane-based resin having a dimethylsiloxane repeating unit, or may be a polysiloxane-based resin further having a methylphenylsiloxane repeating unit, an ethylphenylsiloxane repeating unit, or a diphenylsiloxane repeating unit.

A weight average molecular weight (Mw) of the silicone binder may be 5,000 to 1,000,000, and specifically 10,000 to 500,000, but this is only an example and is not limited thereto.

In this case, in terms of improving adhesion of the conductive paste composition to the silver-coated copper nanowires and dispersibility, the silicone resin binder may contain a silanol group in an amount of 0.1 to 20 wt %, or 0.1 to 15 wt %, or 0.1 to 10 wt %, with respect to 100 wt % of the silicone resin binder. When the content of the silanol satisfies the above range, the conductive paste composition may have excellent adhesion and dispersibility and thus may have excellent electrical properties and mechanical strength.

Here, the silanol group refers to a functional group having a Si—OH unit. Since —OH of the silanol group may have a high interaction with a silver coating layer on a surface of the silver-coated copper nanowire, the silver-coated copper nanowires may exhibit significantly high dispersibility in the binder mixture, and may be uniformly dispersed without agglomeration during a heat treatment process, such that the conductive film may have significantly low sheet resistance and specific resistance.

Furthermore, in terms of improving thermal stability of the conductive paste composition, a ratio of the phenyl group to the methyl group contained in the silicone resin binder is constant. In this regard, as for the ratio of the phenyl group to the methyl group, the phenyl group may be contained in a molar ratio of 0.3 to 2.5, or 0.4 to 2.0, or 0.8 to 1.5, with respect to a molar ratio of 1 of the methyl group. When the ratio of the phenyl group to the methyl group satisfies the above range, the conductive film may have excellent mechanical strength and heat resistance.

The conductive paste composition according to the present disclosure may contain the hydrocarbon-based resin binder in an amount of 3 to 15 wt %, or 3 to 10 wt %, or 5 to 8 wt %. The hydrocarbon-based resin binder serves to form an appropriate thickness when forming a coating film in relation to a viscosity of the paste. When an excessive amount of the hydrocarbon-based resin binder is added, the viscosity of the paste is increased and a coating film is not formed, and when a significantly small amount of the hydrocarbon-based resin binder is added, a coating film is formed at a thin thickness and the conductivity may be reduced.

According to an aspect of the present disclosure, one or a mixture of two or more selected from a cellulose-based binder, an acrylic binder having an acrylic repeating unit containing active hydrogen, and a polyvinyl-based binder may be used as the hydrocarbon-based resin binder. Specifically, one or two or more cellulose-based binders selected from the group consisting of ethyl cellulose, hydroxyethyl cellulose, hydroxypropyl cellulose, hydroxyethyl hydroxypropyl cellulose, and nitrocellulose; an acrylic polymer having an acrylic repeating unit containing active hydrogen; or one or two or more polyvinyl-based polymers selected from the group consisting of polyvinyl butyral, polyvinyl alcohol, polyvinyl acetate, and polyvinyl chloride may be used alone or as a mixture of two or more thereof.

Here, the acrylic repeating unit containing active hydrogen is an acrylic repeating unit containing a residue such as a carboxyl group or a hydroxyl group. The acrylic repeating unit may be specifically derived from monomers of acrylic acid, methacrylic acid, and hydroxyethyl methacrylate, a comonomer is an acrylic copolymer produced by copolymerizing a vinyl-based monomer, and the vinyl-based monomer may be an acrylate-based monomer or a vinyl aromatic monomer.

A weight average molecular weight (Mw) of the hydrocarbon-based resin binder may be 10,000 to 1,500,000, specifically 30,000 to 1,300,000, and more specifically 800,000 to 1,000,000, but this is only an example and is not limited thereto.

The conductive paste composition according to the present disclosure contains the organic solvent, such that the conductive paste composition has a viscosity at which it may be uniformly applied when being coated, and thus, the silver-coated copper nanowires may be uniformly dispersed. Therefore, the conductive paste composition has high conductivity and thus may have improved shielding properties.

In terms of satisfying the effects described above, the conductive paste composition according to the present disclosure may contain the organic solvent in an amount of 50 to 90 wt %, or 60 to 85 wt %, or 70 to 80 wt %. When the organic solvent is less than 50 wt %, the viscosity of the conductive paste composition is increased, such that it is difficult to uniformly apply the conductive paste composition onto the substrate, and when the organic solvent exceeds 90 wt %, the specific resistance of the conductive paste composition is significantly increased, such that the electrical conductivity may be reduced.

According to an aspect of the present disclosure, the organic solvent may be one or two or more selected from acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol ethyl ether, and terpineol.

The conductive paste composition of the present disclosure may be uniformly applied when applied to the substrate by coating or casting, and may be prepared to have a viscosity of 50,000 cp to 400,000 cp, or 80,000 cp to 350,000 cp, or 100,000 to 300,000 cps, when measured at 25° C. so as to improve processability.

The conductive film of the present disclosure may be produced by applying the conductive paste composition to a substrate and performing a heat treatment.

Specifically, as the substrate, a substrate formed of an organic and inorganic material or a metal may be used. Specifically, the substrate may be a plastic substrate, a polymer film substrate, a glass substrate, a quartz substrate, a silicon wafer substrate, a metal substrate, a ceramic substrate, or the like. Examples of a material constituting the substrate may be, but are not limited to, a methacrylate polymer, an aromatic polyester-based polymer, a modified polyphenylene oxide (MPPO)-based polymer, cellulose ester, cellulose acetate, a styrene-butadiene copolymer, an acrylonitrile butadiene styrene copolymer (ABS resin), an olefin maleimide copolymer, quartz, a silicon wafer, aluminum, stainless steel, an epoxy resin, fused silica, glass, regenerated cellulose, triacetyl cellulose, a phenolic resin, polydimethyl cyclohexene terephthalate, polydimethylsiloxane (PDMS), polymethylmethacrylate, polymethylacrylate, polybutadiene, polybutylene terephthalate, polyvinylidene fluoride, polyvinylidenfluoride, polyvinyl acetate, polysulfonate, polysulfone, polystyrene (PS), polysilazane, polysilane, polysiloxane, polyaramid, polyarylate, polyamide, polyamide-imide, polyacrylate, polyacrylonitrile (PAN), polyester, polyethersulfone (PES), polyether nitrile, polyether sulfone, polyether imide, polyether ketone, polyethylene naphthalate (PEN), polyethylene sulfone, polyethylene (PE), polyethylene terephtalate (PET), polyethyl methacrylate, polyethyl acrylate, polyepoxide, polyvinyl chloride, polyoxyethylene, polyolefin, polyurethane, a polyimide resin, polycarbosilane, polycarbonate, polyphenylene sulfide, polyphenylene ether, polypropylene (PP), an AS resin, GaAs, MgO, silica, polyvinyl chloride, polydimethyl cyclohexene terephthalate, and polycarbon.

According to an aspect, the substrate may be selectively subjected to an additional surface treatment using at least one method of a Piranha solution treatment, an acid treatment, a base treatment, a plasma treatment, an atmospheric plasma treatment, an ozone treatment, a UV treatment, a self assembled monolayer (SAM) treatment, and a polymeric or monomeric coating method.

The heat treatment of the present disclosure may be performed at 100 to 300° C. for 10 to 60 minutes. The heat treatment can be performed at 100 to 300° C., or 200 to 300° C., or 250 to 300° C. for physical properties of the film.

The conductive paste composition of the present disclosure may be coated to the substrate through an application method selected from spray coating, gravure coating, microgravure coating, bar-coating, knife coating, reverse roll coating, roll coating, calender coating, curtain coating, extrusion coating, cast coating, dip coating, air-knife coating, foam coating, slit coating, and screen printing, but is not limited thereto.

According to an aspect of the present disclosure, in order to improve conductivity, flexibility, an adhesive force, and an interlayer adhesive force and to uniformly apply the conductive paste composition to the substrate, the conductive paste composition may be applied to the substrate at a thickness of 10 to 1,000 μm or 50 to 500 μm.

According to an aspect of the present disclosure, in order to improve conductivity, flexibility, an adhesive force, and an interlayer adhesive force of the conductive film, a thickness of the conductive film may be 1 to 100 μm or 20 to 80 μm.

In the conductive paste composition containing the silver-coated copper nanowires with a core-shell structure according to the present disclosure that has the configuration described above, the silver-coated copper nanowires with a core-shell structure have an excellent binding force with the silicone resin binder and excellent dispersibility. Although the exact reason is not known, surprisingly, the conductive paste composition has significantly low specific resistance and sheet resistance, such that the conductive paste composition has high electrical conductivity and significantly improves conductivity when applied to the substrate, thereby implementing excellent conductivity.

Therefore, the sheet resistance of the conductive film containing the conductive paste composition containing the silver-coated copper nanowires with a core-shell structure according to the present disclosure may be $5.0 \times 10^{-2}$ to $3.0$ $\Omega/\text{sq}$, specifically $9.0 \times 10^{-2}$ to $2.5$ $\Omega/\text{sq}$, and more specifically $1.0 \times 10^{-1}$ to $2.0$ $\Omega/\text{sq}$. The specific resistance of the conductive film may be $5.0 \times 10^{-7}$ to $5.0 \times 10^{-5}$ $\Omega\text{m}$, specifically $1.0 \times 10^{-6}$ to $4.5 \times 10^{-5}$ $\Omega\text{m}$, and more specifically $5.0 \times 10^{-6}$ to $4.0 \times 10^{-6}$ $\Omega\text{m}$.

Hereinafter, the conductive paste composition containing the silver-coated copper nanowires with a core-shell structure and the conductive film containing the same according to the present disclosure will be described in more detail with reference to Examples. However, the following Examples are only reference examples for describing the present disclosure in detail, and the present disclosure is not limited thereto and may be implemented in various forms.

Unless otherwise defined, all technical terms and scientific terms used herein have the same meaning as commonly understood by those skilled in the art to which the present disclosure pertains. The terms used for the description herein are only for effectively describing a certain Example rather than limiting the present disclosure.

EXAMPLES

Hereinafter, the present disclosure will be described in more detail with reference to Examples. These Examples are only for illustrating the present disclosure. It will be apparent to those skilled in the art that the scope of the present disclosure is not limited by these Examples.

Specifications of equipment and methods of measuring physical properties used in Examples are as follows.

① Sheet resistance: In order to compare electrical conductivities, a sheet resistance of the coating film produced by the following Example was measured using a four-point probe sheet resistance meter (Loresta-GP, MCP-T610, MITSUBISHI CHEMICAL ANALYTECH). When the sheet resistance of the coating film was measured with the four-point probe sheet resistance meter, the measurement was performed by dividing the coating film into four parts, and then an average value was obtained.

② Paste coating: A polyimide film was coated with the prepared conductive paste using a bar coater (ERICHSEN, Model-510).

③ Film thickness measurement: A thickness of the silver-coated copper nanowire with a core-shell structure was measured with a thickness gauge (ERICHSEN, Foil Thickness Gauge Model 497).

Example 1: Silver-Coated Copper Nanowire Conductive Paste when Content of Filler is 13.6 wt % in Total Conductive Paste Composition 28.12 g (76.8 wt % of the total weight) of terpineol (α-terpineol, Sigma-Aldrich) as an organic solvent and 2.36 g (6.4 wt % of the total weight) of ethyl cellulose (Sigma-Aldrich) were added to a 100 ml Erlenmeyer flask, and the ethyl cellulose was dissolved while stirring was performed in a hot plate at 70° C. and 500 rpm. Then, 5 g (13.6 wt % of the total weight) of the silver-coated copper nanowires with a core-shell structure produced by the method described in Korean Patent No. 10-1789213 B1 (publication date: Oct. 26, 2017) was added, and 3.16 g (8.6 wt % of the total weight) of a silicone adhesive (RSN-0806, Dow Corning) was added and mixed well, and then, a dispersion treatment was performed five times using a 3 roll mill (EXAKT 50), thereby preparing a conductive paste composition (FIG. 1).

Separately, 10 ml of the conductive paste composition was added onto a 100 mm×100 mm polyimide film, and coating was performed at a wet thickness of 500 μm. The temperature of the produced coating film was increased to 250° C. at a temperature increase rate of 2° C./min, and then, a heat treatment was performed at 250° C. for 30 minutes, thereby producing a coating film. At this time, the final dry thickness of the conductive paste was about 26 μm. At this time, the measured sheet resistance was $2.7 \times 10^{-1}$ Ω/sq, and the measured specific resistance was $7.16 \times 10^{-6}$ Ω·m (Table 1).

Example 2: Silver-Coated Copper Nanowire Conductive Paste when Content of Filler is 8 wt % in Total Conductive Paste Composition Example 2 was performed in the same manner as that of Example 1, except that 3 g of the silver-coated copper nanowires were used.

The final dry thickness of the conductive paste coating film produced in Example 2 was about 21 μm. At this time, the measured sheet resistance was $1.74 \times 10^{0}$ Ω/sq, and the measured specific resistance was $3.65 \times 10^{-5}$ Ω·m (Table 1).

Comparative Example 1: Conductive Paste Composition Using Silver Nanoparticles (Filler Content: 8 wt %)

Comparative Example 1 was performed in the same manner as that of Example 2, except that silver nanoparticles were used instead of the silver-coated copper nanowires.

Compared with Example 2, the specific resistance of Example 2 was $3.65 \times 10^{-5}$ Ω·m. On the other hand, when the conductive paste composition was prepared using silver nanoparticles, it could be appreciated that the measured sheet resistance was $9.27 \times 10^{0}$ Ω/sq, and the specific resistance was $1.16 \times 10^{-4}$ Ω·m, which was increased by 1 order or more (Table 1). It could be confirmed from this that a lower specific resistance was obtained when the conductive film was produced using the conductive paste composition containing silver-coated copper nanowires rather than silver nanoparticles. As a result, it could be confirmed that in the case where the conductive paste composition was prepared using silver-coated copper nanowires rather than the case where the conductive paste composition was prepared using silver nanoparticles, even though a lower amount of a filler was contained, a conductive film having more excellent electrical physical properties was provided.

TABLE 1

| Item | Type of filler | Content of filler | Specific resistance (Ω · m) |
|---|---|---|---|
| Example 1 | Silver-coated copper nanowires | 13.6 wt % | $7.16 \times 10^{-6}$ |
| Example 2 | Silver-coated copper nanowires | 8 wt % | $3.65 \times 10^{-5}$ |
| Comparative Example 1 | Silver nanoparticles | 8 wt % | $1.16 \times 10^{-4}$ |

The invention claimed is:

1. A conductive paste composition comprising: a silver-coated copper nanowire having a core-shell structure; a binder mixture containing a silicone resin binder and a hydrocarbon-based resin binder; and an organic solvent,
    wherein the silver-coated copper nanowire having a core-shell structure is contained in an amount of 5 to 10 wt % relative to the weight of the total composition;
    wherein the silicone resin binder is contained in an amount of 3 to 20 wt %;
    wherein the hydrocarbon-based binder is contained in an amount of 3 to 15 wt %;
    wherein a weight ratio of the binder mixture comprising the silicone resin binder and the hydrocarbon-based resin binder to the silver-coated copper nanowire is 1:0.1 to 1.2; and
    wherein a conductive film formed from the composition exhibits a resistivity in a range of $5.0 \times 10^{-7}$ to $5.0 \times 10^{-5}$ Ω·m.

2. The conductive paste composition of claim 1, wherein in the silicone resin binder, a silanol group is contained in an amount of 0.1 to 10 wt % with respect to a total weight of the silicone resin binder, and a molar ratio of a phenyl group to a methyl group is 0.3 to 2.5.

3. The conductive paste composition of claim 2, wherein one or a mixture of two or more selected from a cellulose-based binder, an acrylic binder having an acrylic repeating unit containing active hydrogen, and a polyvinyl-based binder is used as the hydrocarbon-based resin binder.

4. The conductive paste composition of claim 1, wherein a weight ratio of the hydrocarbon-based resin binder to the silicone resin binder is 1:0.8 to 1.8.

5. The conductive paste composition of claim 1, wherein the conductive paste composition contains the organic solvent in an amount of 50 to 90 wt %.

6. The conductive paste composition of claim 1, wherein the organic solvent is one or two or more selected from acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethyl sulfoxide, diethylene glycol ethyl ether, and terpineol.

7. A conductive film comprising the conductive paste composition of claim 1, and having a resistivity of $5.0 \times 10-7$ to $5.0 \times 10-5$ Ω·m.

* * * * *